United States Patent
Nishiyama et al.

(10) Patent No.: US 10,527,707 B2
(45) Date of Patent: Jan. 7, 2020

(54) IN-VEHICLE COMMUNICATION DEVICE AND COMMUNICATION METHOD

(71) Applicant: TOYOTA JIDOSHA KABUSHIKI KAISHA, Toyota-shi, Aichi-ken (JP)

(72) Inventors: Shigeki Nishiyama, Nagoya (JP); Tomoyuki Funayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/237,809

(22) Filed: Jan. 2, 2019

(65) Prior Publication Data

US 2019/0227142 A1 Jul. 25, 2019

(30) Foreign Application Priority Data

Jan. 19, 2018 (JP) .................... 2018-007383

(51) Int. Cl.
*G07C 9/00* (2006.01)
*H04W 64/00* (2009.01)
(Continued)

(52) U.S. Cl.
CPC .......... *G01S 5/0242* (2013.01); *G01S 5/0215* (2013.01); *G01S 5/145* (2013.01); *G07C 9/00309* (2013.01); *H04W 64/003* (2013.01); *G07C 2009/00333* (2013.01); *G07C 2009/00515* (2013.01); *G07C 2009/00547* (2013.01)

(58) Field of Classification Search
CPC ...... G01S 5/0242; G01S 5/0215; G01S 5/145; G07C 9/00309; G07C 2009/00333; G07C 2009/00515; G07C 2009/00547; H04W 64/003; B60R 25/245

See application file for complete search history.

(56) References Cited

U.S. PATENT DOCUMENTS

| 7,292,137 B2 * | 11/2007 | Gilbert | .................... B60R 25/24 307/10.1 |
| 2003/0193388 A1 * | 10/2003 | Ghabra | .................... B60R 25/24 340/5.61 |

(Continued)

FOREIGN PATENT DOCUMENTS

| JP | 2001-115705 A | 4/2001 |
| JP | 2017-079430 A | 4/2017 |

*Primary Examiner* — Marisol Figueroa
(74) *Attorney, Agent, or Firm* — Oliff PLC

(57) ABSTRACT

An in-vehicle communication device includes a transmission controller configured to perform control so that a first signal is transmitted from outside and a predetermined second signal is transmitted from outside and inside, after the transmission of the first signal, and a determination unit configured to determine whether the terminal device is present outside or inside based on a first response signal that is transmitted from the terminal device after the transmission of the second signal. When the determination unit is unable to determine whether the terminal device is present outside or inside, the transmission controller is configured to perform control so that a third signal is transmitted from inside, and the determination unit is configured to determine whether the terminal device is present outside or inside based on a second response signal that is transmitted from the terminal device after the transmission of the third signal.

10 Claims, 8 Drawing Sheets

(51) Int. Cl.
 *G01S 5/02* (2010.01)
 *G01S 5/14* (2006.01)

(56) References Cited

U.S. PATENT DOCUMENTS

2011/0309922 A1    12/2011  Ghabra et al.
2012/0286926 A1*   11/2012  Higemoto .............. B60R 25/24
                                                340/5.61

* cited by examiner

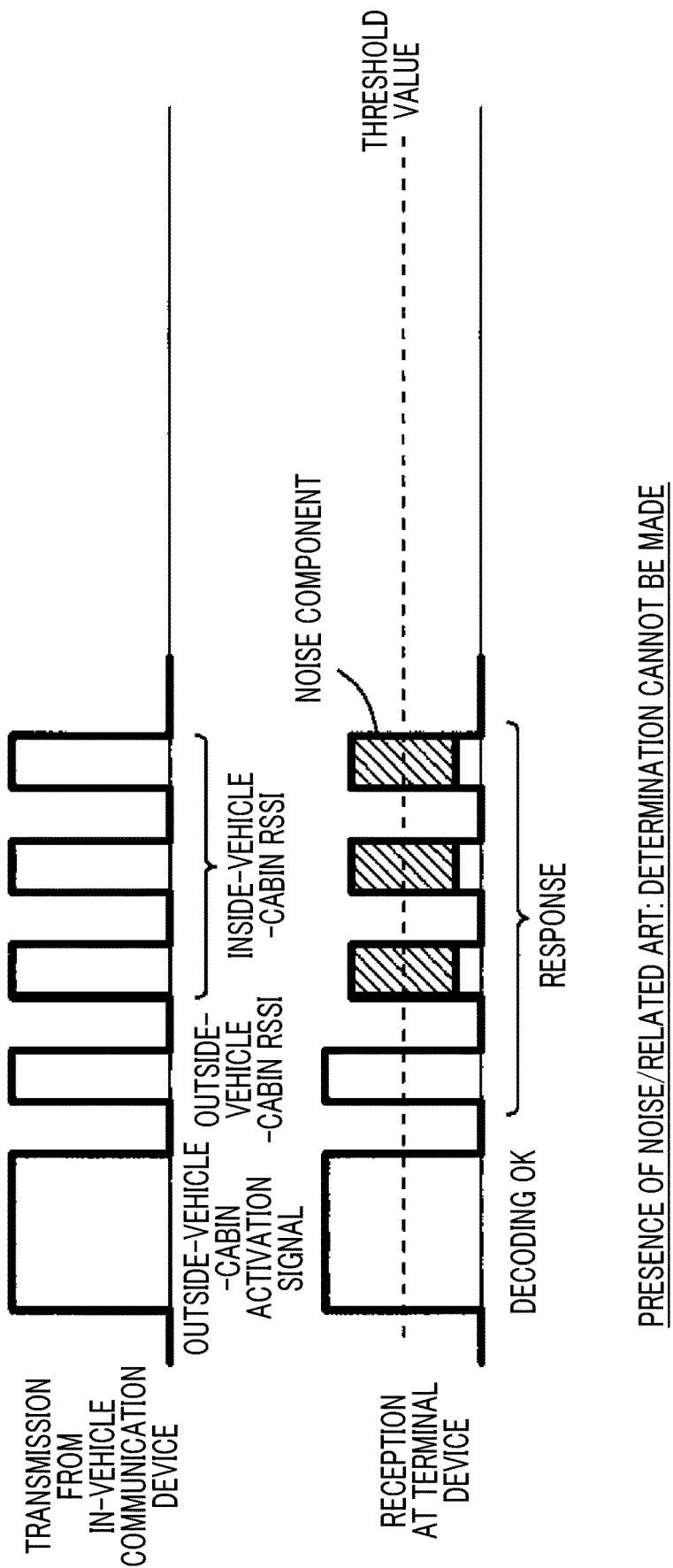

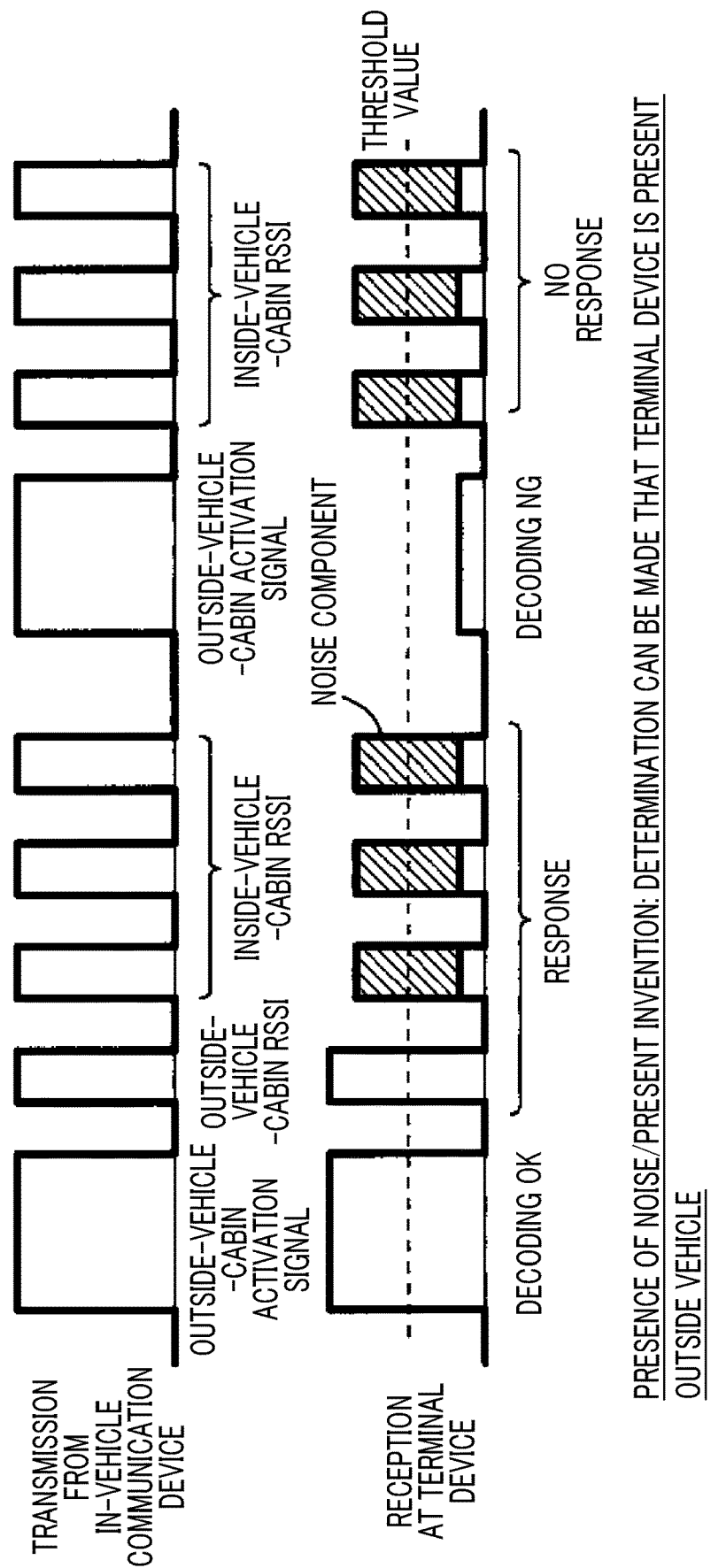

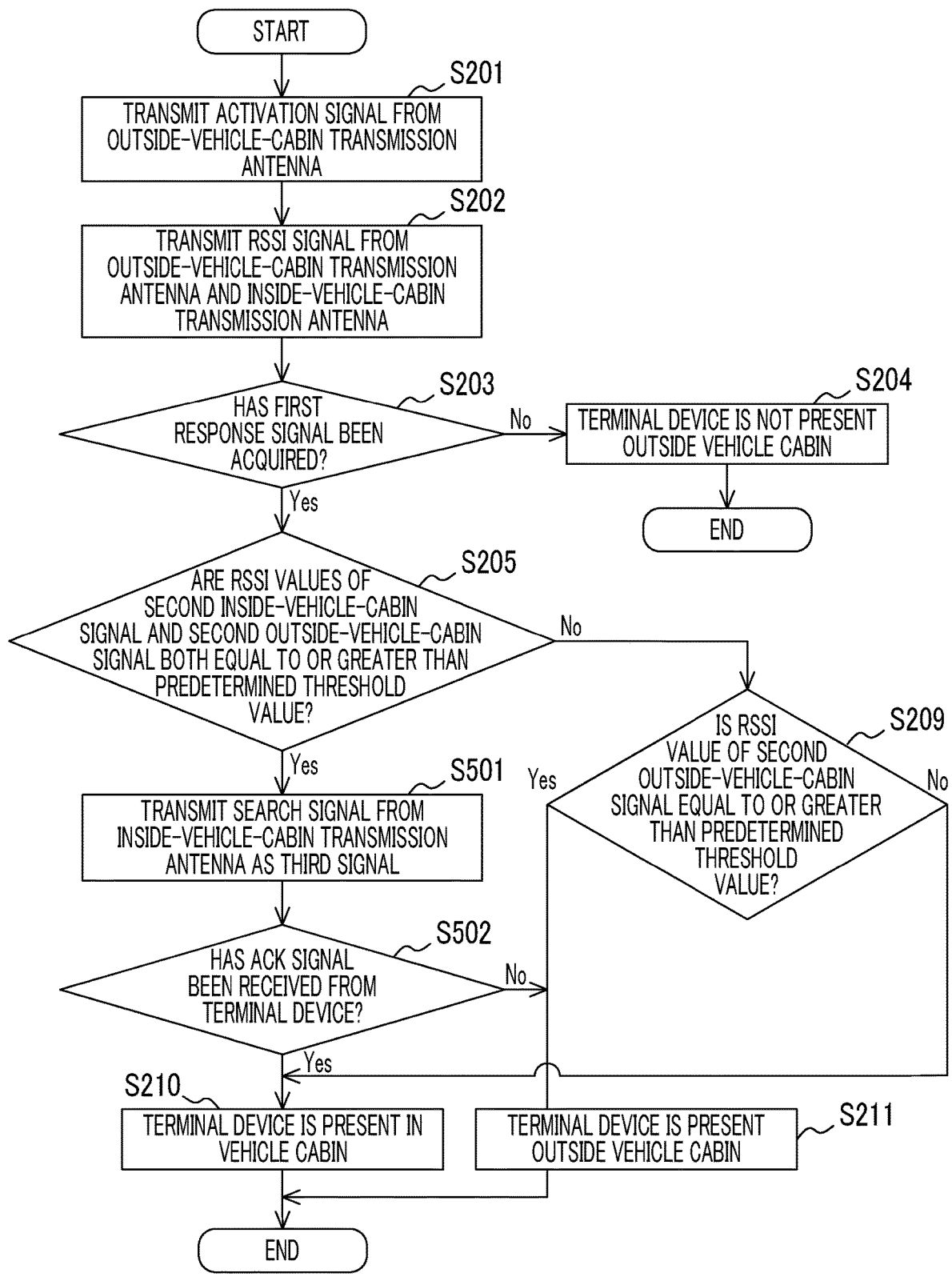

IN-VEHICLE COMMUNICATION DEVICE AND COMMUNICATION METHOD

INCORPORATION BY REFERENCE

The disclosure of Japanese Patent Application No. 2018-007383 filed on Jan. 19, 2018 including the specification, drawings and abstract is incorporated herein by reference in its entirety.

BACKGROUND

1. Technical Field

The present invention relates to an in-vehicle communication device mounted in a vehicle that performs communication with a terminal device having key information of the vehicle and a communication method executed by the in-vehicle communication device.

2. Description of Related Art

Japanese Unexamined Patent Application Publication No. 2001-115705 (JP 2001-115705 A) and Japanese Unexamined Patent Application Publication No. 2017-079430 (JP 2017-079430 A) disclose a vehicle system (such as a smart entry system) in which a terminal device having key information carried by a user (such as a smartphone in which a dedicated electronic key or key information has been installed) and an in-vehicle communication device mounted on a vehicle control the vehicle through wireless communication.

In such a vehicle system, the terminal device and the in-vehicle communication device transmit or receive a predetermined signal via antennas and perform a predetermined key information collation process, or the like, thereby authenticating the terminal device at the in-vehicle communication device. The control of the vehicle is executed, for example, by performing predetermined manipulation input to the vehicle after authenticating the terminal device.

SUMMARY

In general, under a communication environment in which there is noise, the noise is superimposed on a signal transmitted from an antenna for collation of the terminal device. Therefore, when the communication environment is a communication environment (for example, a wireless charging facility for coin parking, a plug-in hybrid vehicle (HV), or an electric vehicle (EV)) in which steady noise having an influence is generated, there is a possibility that, in a terminal device collation process, reception strength of a signal transmitted from an inside-vehicle-cabin transmission antenna to the terminal device and reception strength of a signal transmitted from an outside-vehicle-cabin transmission antenna to the terminal device both exceed a threshold value that is a criterion for determining whether or not there is the terminal device, and the in-vehicle communication device is unable to determine whether the terminal device is present outside or inside the vehicle.

The present invention provides an in-vehicle communication device and a communication method capable of accurately determining whether a terminal device having key information is present outside or inside a vehicle even under a communication environment in which there is an influence of noise.

A first aspect of the present invention relates to an in-vehicle communication device configured to perform communication with a terminal device having key information of a vehicle. The in-vehicle communication device includes a transmission controller configured to perform control so that a first signal for activating the terminal device is transmitted from an outside-vehicle-cabin transmission antenna mounted outside the vehicle and perform control so that a predetermined second signal is transmitted from the outside-vehicle-cabin transmission antenna and an inside-vehicle-cabin transmission antenna mounted inside the vehicle, after the transmission of the first signal; and a determination unit configured to determine whether the terminal device is present outside or inside the vehicle based on a first response signal that is transmitted from the terminal device to the in-vehicle communication device after the transmission of the second signal. The transmission controller is configured to perform, when the determination unit is unable to determine whether the terminal device is present outside or inside the vehicle, control so that a third signal for activating the terminal device is transmitted from the inside-vehicle-cabin transmission antenna, and the determination unit is configured to determine whether the terminal device is present outside or inside the vehicle based on a second response signal that is transmitted from the terminal device to the in-vehicle communication device after the transmission of the third signal.

In the in-vehicle communication device according to the first aspect of the present invention, when the determination unit is unable to determine whether the terminal device is present outside or inside the vehicle through a communication process using the second signal directed to the outside of the vehicle cabin and the inside of the vehicle cabin, a communication process using the third signal directed to solely the inside of the vehicle cabin is performed. According to the first aspect of the present invention, it is possible to determine whether the terminal device is present outside or inside the vehicle based on a response from the terminal device after the transmission of the third signal.

In the in-vehicle communication device according to the first aspect of the present invention, the determination unit may be configured to refer to reception strength information of the second signal in the terminal device included in the first response signal, and determine that the determination unit is unable to determine whether the terminal device is present outside or inside the vehicle based on the first response signal when reception strength of the second signal transmitted from the outside-vehicle-cabin transmission antenna is equal to or greater than a predetermined threshold value and reception strength of the second signal transmitted from the inside-vehicle-cabin transmission antenna is equal to or greater than a predetermined threshold value.

By making such a determination, it is possible to avoid an erroneous determination as to whether the terminal device is present outside or inside the vehicle under a communication environment in which there is an influence of noise.

In the in-vehicle communication device according to the aspect of the present invention, the determination unit may be configured to determine, in a case where the determination unit is unable to determine whether the terminal device is present outside or inside the vehicle based on the first response signal, that the terminal device is present inside the vehicle when the second response signal is received from the terminal device after the transmission of the third signal.

In the in-vehicle communication device according to the aspect of the present invention, the determination unit may be configured to determine, in a case where the determination unit is unable to determine whether the terminal device is present outside or inside the vehicle based on the first response signal, that the terminal device is present outside the vehicle when the second response signal is not received from the terminal device after the transmission of the third signal.

According to the first aspect of the present invention, even when the determination unit is unable to determine whether the terminal device is present outside or inside the vehicle through the communication process using the second signal directed to the outside of the vehicle cabin and the inside of the vehicle cabin, which is first performed, it is possible to accurately determine whether the terminal device is present outside or inside the vehicle based on a response to the communication using the third signal directed to the inside of the vehicle cabin that is performed next.

In the in-vehicle communication device according to the aspect of the present invention, the transmission controller may be configured to transmit a predetermined fourth signal from the inside-vehicle-cabin transmission antenna after the transmission of the third signal. The determination unit may be configured to determine that the terminal device is present inside the vehicle when the determination unit is unable to determine whether the terminal device is present outside or inside the vehicle based on the first response signal and when it is determined that reception strength of the fourth signal is equal to or greater than a predetermined threshold value based on reception strength information of the fourth signal in the terminal device included in the second response signal.

In the in-vehicle communication device according to the aspect of the present invention, the transmission controller may be configured to transmit a predetermined fourth signal from the inside-vehicle-cabin transmission antenna after the transmission of the third signal. The determination unit may be configured to determine that the terminal device is present outside the vehicle when the determination unit is unable to determine whether the terminal device is present outside or inside the vehicle based on the first response signal and when it is determined that reception strength of the fourth signal is lower than a predetermined threshold value based on reception strength information of the fourth signal in the terminal device included in the second response signal.

According to the first aspect of the present invention, even when the determination unit is unable to determine whether the terminal device is present outside or inside the vehicle through the communication using the first signal and the second signal which is first performed, it is possible to further accurately determine whether the terminal device is present outside or inside the vehicle based on the reception strength of the fourth signal in the communication using the third signal and the fourth signal which is performed next.

In the in-vehicle communication device according to the first aspect of the present invention, the determination unit may be configured to determine that the terminal device is present outside the vehicle when it is determined, based on reception strength information of the second signal in the terminal device included in the first response signal, that reception strength of the second signal transmitted from the outside-vehicle-cabin transmission antenna is equal to or greater than a predetermined threshold value and that reception strength of the second signal transmitted from the inside-vehicle-cabin transmission antenna is lower than a predetermined threshold value.

In the in-vehicle communication device according to the first aspect of the present invention, the determination unit may be configured to determine that the terminal device is present inside the vehicle when it is determined, based on reception strength information of the second signal in the terminal device included in the first response signal, that the reception strength of the second signal transmitted from the outside-vehicle-cabin transmission antenna is lower than a predetermined threshold value and that reception strength of the second signal transmitted from the inside-vehicle-cabin transmission antenna is equal to or greater than a predetermined threshold value.

According to the first aspect of the present invention, it is possible to further accurately determine whether the terminal device is present outside or inside the vehicle based on the reception strength of the second signal in the communication process using the second signal directed to the outside of the vehicle cabin and the inside of the vehicle cabin which is performed next.

In the in-vehicle communication device according to the first aspect of the present invention, the transmission controller may be configured to make an output intensity of the third signal lower than an output intensity of the first signal.

According to the first aspect of the present invention, it is possible to suppress, for example, the third signal transmitted toward solely the inside of the vehicle cabin reaching the outside of the vehicle under a communication environment in which there is an influence of noise. Therefore, it is possible to suppress the determination unit being unable to determine whether the terminal device is present outside or inside the vehicle through communication using the third signal.

A second aspect of the present invention relates to a communication method by which an in-vehicle communication device performs communication with a terminal device having key information of a vehicle. The communication method includes transmitting a first signal for activating the terminal device from an outside-vehicle-cabin transmission antenna mounted outside the vehicle, when a collation process of the terminal device is needed; transmitting a predetermined second signal from the outside-vehicle-cabin transmission antenna and an inside-vehicle-cabin transmission antenna mounted inside the vehicle, after the transmission of the first signal; determining whether the terminal device is present outside or inside the vehicle based on a first response signal that is received from the terminal device after the transmission of the second signal; transmitting a third signal for activating the terminal device from the inside-vehicle-cabin transmission antenna when, through the determination, the in-vehicle communication device is unable to determine whether the terminal device is present outside or inside the vehicle; and determining whether the terminal device is present outside or inside the vehicle based on a second response signal that is received from the terminal device after the transmission of the third signal.

With the communication method according to the second aspect of the present invention, when the in-vehicle communication device is unable to determine whether the terminal device is present outside or inside the vehicle through the communication process using the second signal directed to the outside of the vehicle cabin and the inside of the vehicle cabin, it is possible to determine whether the terminal device is present outside or inside the vehicle based on a response from the terminal device after the transmission of the third signal directed to the vehicle cabin.

According to the in-vehicle communication device and the communication method according to the respective aspects of the present invention described above, it is possible to accurately determine whether a terminal device having key information is present outside or inside a vehicle even under a communication environment in which there is an influence of noise.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3B is a timing diagram illustrating a difference between communication control of the embodiment and communication control of the related art;

FIG. 3C is a timing diagram illustrating a difference between communication control of the embodiment and communication control of the related art;

FIG. 5 is a flowchart illustrating a modification example of communication control that is executed by the in-vehicle communication device according to the embodiment.

DETAILED DESCRIPTION OF EMBODIMENTS

Overview

An in-vehicle communication device of the present invention first determines whether a terminal device is present outside or inside the vehicle through a communication process outside the vehicle cabin and inside the vehicle cabin. In this communication process, when the in-vehicle communication device is unable to determine whether the terminal device is present outside or inside the vehicle, the in-vehicle communication device performs the communication process again solely in the vehicle cabin and determines whether the terminal device is present outside or inside the vehicle.

Configuration

Figure 1:
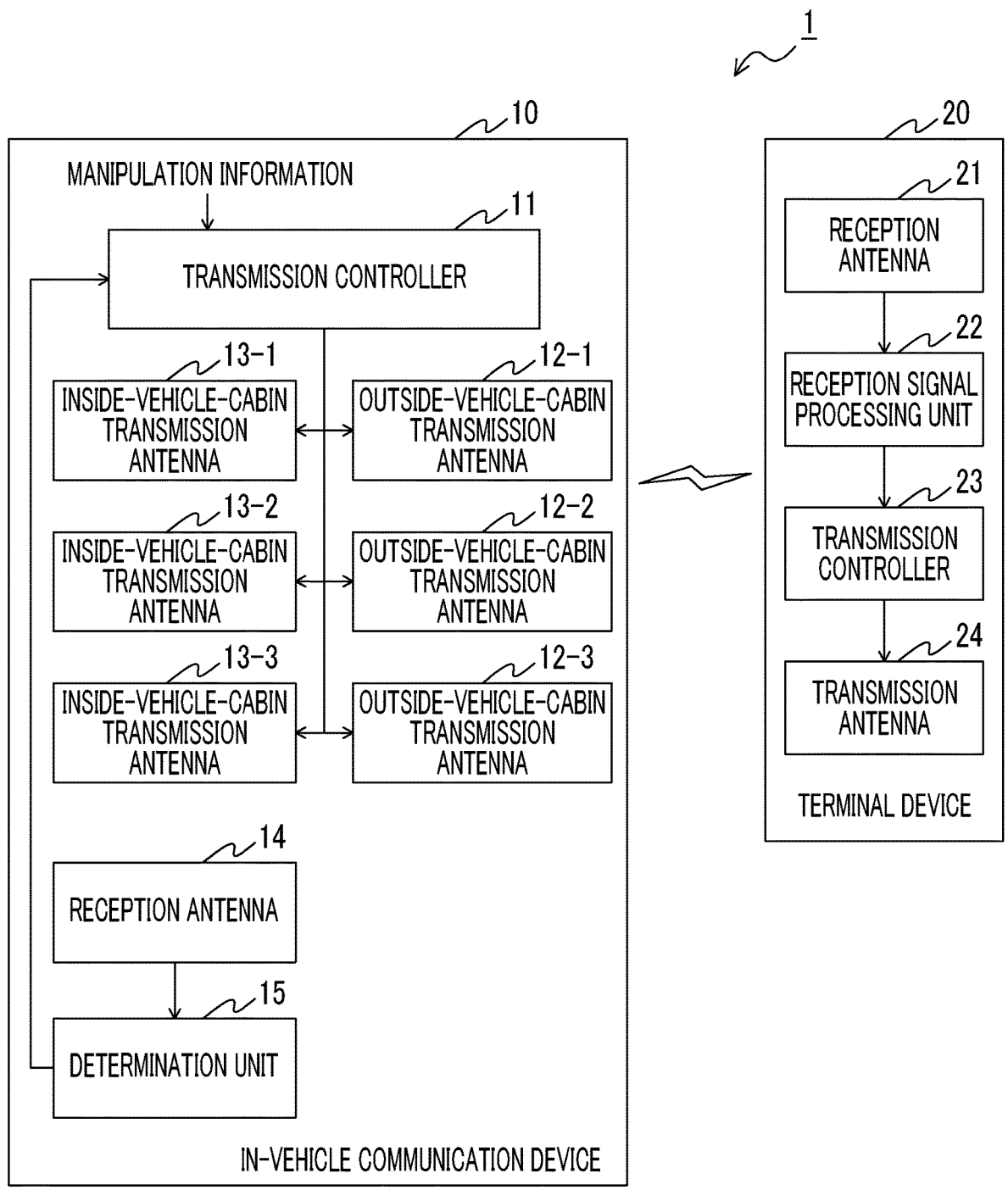
FIG. 1 is a block diagram schematically illustrating a vehicle system including an in-vehicle communication device according to an embodiment of the present invention.

FIG. 1 is a diagram illustrating an overview of a vehicle system 1 including an in-vehicle communication device 10 according to an embodiment of the present invention. The vehicle system 1 illustrated in FIG. 1 includes the in-vehicle communication device 10 and a terminal device 20 having key information of a predetermined vehicle.

The vehicle system 1 is a so-called smart entry system (also referred to as an electronic key system, a wireless key system, a keyless entry system, or the like) that executes a collation process using the key information between the in-vehicle communication device 10 and the terminal device 20 through wireless communication to control a predetermined vehicle manipulation (locking or unlocking of a vehicle door, start of an engine, or the like).

The in-vehicle communication device 10 according to the embodiment includes a transmission controller 11, a plurality of outside-vehicle-cabin transmission antennas 12 (12-1 to 12-3), a plurality of inside-vehicle-cabin transmission antennas 13 (13-1 to 13-3), a reception antenna 14, and a determination unit 15.

The transmission controller 11 can control a collation signal of the terminal device 20 to be transmitted from the outside-vehicle-cabin transmission antenna 12 and the inside-vehicle-cabin transmission antenna 13 based on manipulation information including a manipulation of locking or unlocking a vehicle door acquired from a device (not illustrated) and determination information of which the determination unit 15 notifies. The collation signal is, for example, a signal for activating the terminal device 20 to start the collation process, and is a signal including predetermined key information of the vehicle (a collation code according to a combination of 0 and 1) (hereinafter referred to as an "activation signal"), a signal for measurement of a received signal strength indication (RSSI) (hereinafter referred to as an "RSSI signal"), a signal for confirmation of the presence of the terminal device 20 (hereinafter referred to as a "search signal"), and the like. This collation signal can be, for example, a low frequency (LF) signal. The control executed by the transmission controller 11 will be described below.

The outside-vehicle-cabin transmission antennas 12 are antennas mounted outside the vehicle. The outside-vehicle-cabin transmission antennas 12 are typically provided near respective doors of the vehicle (for example, a driver seat door, a passenger seat door, a back door, and the like) and are configured to be able to transmit a collation signal toward a predetermined detection area outside a vehicle cabin based on an instruction from the transmission controller 11. A case where the number of outside-vehicle-cabin transmission antennas 12 (12-1 to 12-3) is three has been illustrated in FIG. 1, but the number of outside-vehicle-cabin transmission antennas 12 outside the vehicle cabin is not limited thereto.

The inside-vehicle-cabin transmission antennas 13 are antennas mounted inside the vehicle. The inside-vehicle-cabin transmission antennas 13 are typically distributed to cover the entire cabin of the vehicle (for example, on the front side of the vehicle cabin, on the center of the vehicle cabin, the rear side of the vehicle cabin, and the like) and are configured to be able to transmit a collation signal toward a predetermined detection area of the vehicle cabin under the control of the transmission controller 11. A case in which the number of inside-vehicle-cabin transmission antennas 13 (13-1 to 13-3) is three has been illustrated in FIG. 1, but the number of inside-vehicle-cabin transmission antennas 13 is not limited thereto.

The reception antenna 14 is an antenna mounted at a predetermined position of the vehicle and is configured to be able to receive a response signal transmitted from the terminal device 20 that has received the collation signal. A case where the number of reception antennas 14 is one has been illustrated in FIG. 1, but the number of reception antennas 14 is not limited thereto.

The determination unit 15 can determine whether the terminal device 20 is present outside the vehicle (outside the vehicle cabin) or inside the vehicle (inside the vehicle cabin) based on a response from the terminal device 20 to the collation signal. Further, when the determination unit 15 is unable to determine whether the terminal device 20 is present outside or inside the vehicle, the determination unit 15 notifies the transmission controller 11 of predetermined determination information. Control to be executed by the determination unit 15 will be described below.

Both or one of the transmission controller 11 and the determination unit 15 described above can be typically configured as an electronic control unit (ECU) including a central processing unit (CPU), a memory, an input and output interface, and the like. In the electronic control unit, a predetermined function is realized by the CPU reading and executing a predetermined program stored in the memory.

The terminal device 20 includes a reception antenna 21, a reception signal processing unit 22, a transmission controller 23, and a transmission antenna 24.

The reception antenna 21 is configured to be able to receive the collation signal transmitted from the transmission controller 11. In FIG. 1, a case where there is one reception antenna 21 is illustrated, but the number of reception antennas 21 is not limited thereto.

The reception signal processing unit 22 can process the collation signal received by the reception antenna 21. For example, when the collation signal is an activation signal, the reception signal processing unit 22 can perform a process of decoding the collation code to activate the terminal device 20. When the collation signal is an RSSI signal, the reception signal processing unit 22 can perform a process of measuring receivable signal strength and generating a response signal including a result of the measurement. When the collation signal is a search signal, the reception signal processing unit 22 can perform a process of generating a response signal including an acknowledge (ACK).

The transmission controller 23 can transmit the response signal generated by the reception signal processing unit 22 from the transmission antenna 24. This response signal can be, for example, a signal at a radio frequency (RF).

The transmission antenna 24 is configured to transmit the response signal based on an instruction from the transmission controller 23. In FIG. 1, a case where there is one transmission antenna 24 is illustrated, but the number of transmission antennas 24 is not limited thereto.

Control

Figure 2:
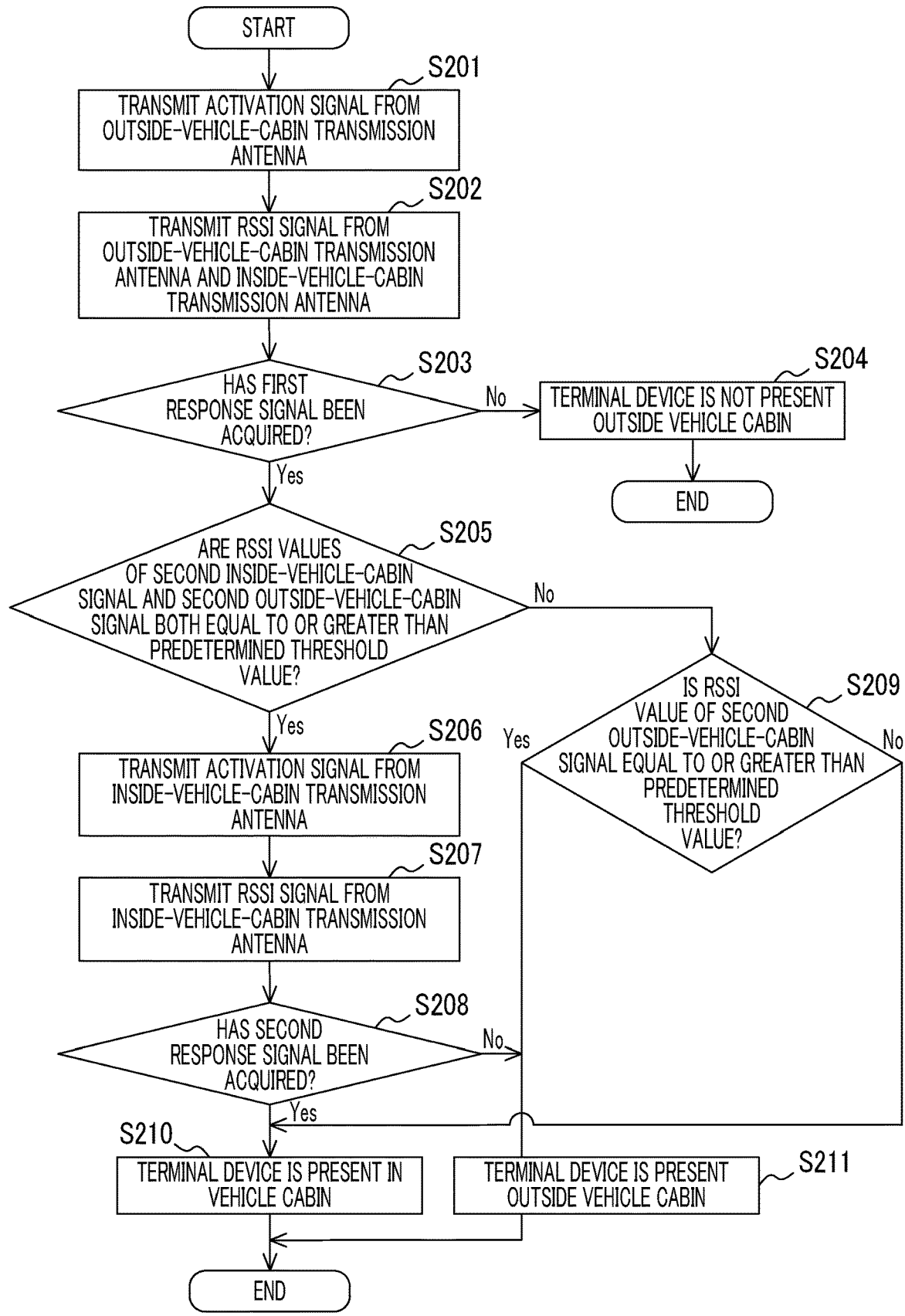
FIG. 2 is a flowchart of communication control that is executed by the in-vehicle communication device according to the embodiment.

Communication control that is executed by the in-vehicle communication device 10 will be described further with reference to FIG. 2. FIG. 2 is a flowchart illustrating a communication control processing procedure that is executed by the transmission controller 11 and the determination unit 15 of the in-vehicle communication device 10 according to the embodiment of the present invention.

The communication control illustrated in FIG. 2 is started, for example, when a collation process of the terminal device 20 has been needed due to performance of a user manipulation for instructing the vehicle to lock or unlock the vehicle door. Hereinafter, communication control in an example of a situation in which a user touches a sensor built in a door handle outside the vehicle cabin will be described.

Step S201: In order to confirm the presence of the terminal device 20 in the detection area outside the vehicle cabin, the transmission controller 11 first transmits an activation signal (hereinafter referred to as a "first signal") from the outside-vehicle-cabin transmission antenna 12.

Step S202: Then, the transmission controller 11 transmits an RSSI signal (hereinafter referred to as a "second outside-vehicle-cabin signal") from the outside-vehicle-cabin transmission antenna 12 and then an RSSI signal (hereinafter referred to as "second inside-vehicle-cabin signal") from the inside-vehicle-cabin transmission antenna 13.

Step S203: The determination unit 15 determines whether or not a response signal (hereinafter referred to as a "first response signal") including an RSSI value indicating a received signal strength of the second inside-vehicle-cabin signal and the second outside-vehicle-cabin signal transmitted from the terminal device 20 has been able to be acquired via the reception antenna 14. When the determination unit 15 determines that the first response signal has been able to be acquired (Yes in S203), the process proceeds to step S205, and when the determination unit 15 determines that the first response signal could not have been acquired until the predetermined time elapses (No in S203), the process proceeds to step S204.

Step S204: When the first response signal could not have been acquired, the determination unit 15 determines that the terminal device 20 is not present at least in the detection area of the outside-vehicle-cabin transmission antenna 12, that is, the terminal device 20 is not present outside the vehicle (outside the vehicle cabin). According to this determination, in the vehicle, a predetermined alarm can be output or performance of a vehicle manipulation (locking or unlocking of the vehicle door) according to a user manipulation can be suppressed. According to this determination in step S204, this communication control process ends.

Step S205: The determination unit 15 determines whether or not the RSSI value of the second outside-vehicle-cabin signal is equal to or greater than a predetermined threshold value and the RSSI value of the second inside-vehicle-cabin signal is equal to or greater than the predetermined threshold value based on the acquired first response signal. This threshold value is a reference value for determining whether or not the terminal device 20 has been able to correctly receive the second signal transmitted from the in-vehicle communication device 10, and can be optionally set according to an antenna installation place, regulations regarding the output intensity of the second signal, or the like. The threshold value for determining the RSSI value of the second outside-vehicle-cabin signal and the threshold value for determining the RSSI value of the second inside-vehicle-cabin signal may be the same value or different values.

When the determination unit 15 determines that both of the RSSI values of the second inside-vehicle-cabin signal and the second outside-vehicle-cabin signal are equal to or greater than the predetermined threshold value (Yes in S205), the determination unit 15 is unable to determine whether the terminal device 20 is present outside or inside the vehicle based on the first response signal. Therefore, the process proceeds to step S206. On the other hand, when the determination unit 15 has determined that the RSSI value of the second inside-vehicle-cabin signal and the RSSI value of the second outside-vehicle-cabin signal are both not equal to or greater than the predetermined threshold value, that is, when the determination unit 15 has determined that any one of the RSSI value of the second outside-vehicle-cabin signal and the RSSI value of the second inside-vehicle-cabin signal is equal to or greater than the predetermined threshold value (No in S205), the process proceeds to step S209.

Step S206: In order to confirm the presence of the terminal device 20 in the detection area inside the vehicle cabin, the transmission controller 11 first transmits an activation signal (hereinafter referred to as a "third signal") from the inside-vehicle-cabin transmission antenna 13.

Step S207: The transmission controller 11 then transmits an RSSI signal (hereinafter referred to as a "fourth signal") from the inside-vehicle-cabin transmission antenna 13.

Step S208: The determination unit 15 determines whether or not a response signal (hereinafter referred to as a "second response signal") including an RSSI value indicating a received signal strength of a fourth inside-vehicle-cabin signal transmitted from the terminal device 20 has been able to be acquired via the reception antenna 14. When the determination unit 15 has determined that the second response signal has been able to be acquired (Yes in S208), the process proceeds to step S210. When the determination unit 15 has determined that the second response signal has been unable to be acquired until the predetermined time has elapsed (No in S208), the process proceeds to step S211.

Step S209: The determination unit 15 determines whether or not the RSSI value of the second outside-vehicle-cabin signal is equal to or greater than a predetermined threshold value based on the acquired second response signal. When the determination unit 15 determines that the signal is the second outside-vehicle-cabin signal (Yes in S209), the process proceeds to step S211, and when the determination unit 15 determines that the signal is not the second outside-vehicle-cabin signal (that is, the second inside-vehicle-cabin signal) (No in S209), the process proceeds to step S210.

Step S210: The determination unit 15 determines that the terminal device 20 is present in the detection area of the inside-vehicle-cabin transmission antenna 13, that is, that the terminal device 20 is present inside the vehicle (inside the vehicle cabin). According to this determination, in the vehicle, a predetermined alarm can be output or performance of a vehicle manipulation (locking or unlocking of the vehicle door) according to a user manipulation can be suppressed. According to this determination in step S210, this communication control process ends.

Step S211: The determination unit 15 determines that the terminal device 20 is present in the detection area of the outside-vehicle-cabin transmission antenna 12, that is, that the terminal device 20 is present outside the vehicle (outside the vehicle cabin). According to this determination, a vehicle manipulation (locking or unlocking of the vehicle door) according to a user manipulation can be performed. According to the determination in step S211, this communication control process ends.

Figure 3A:
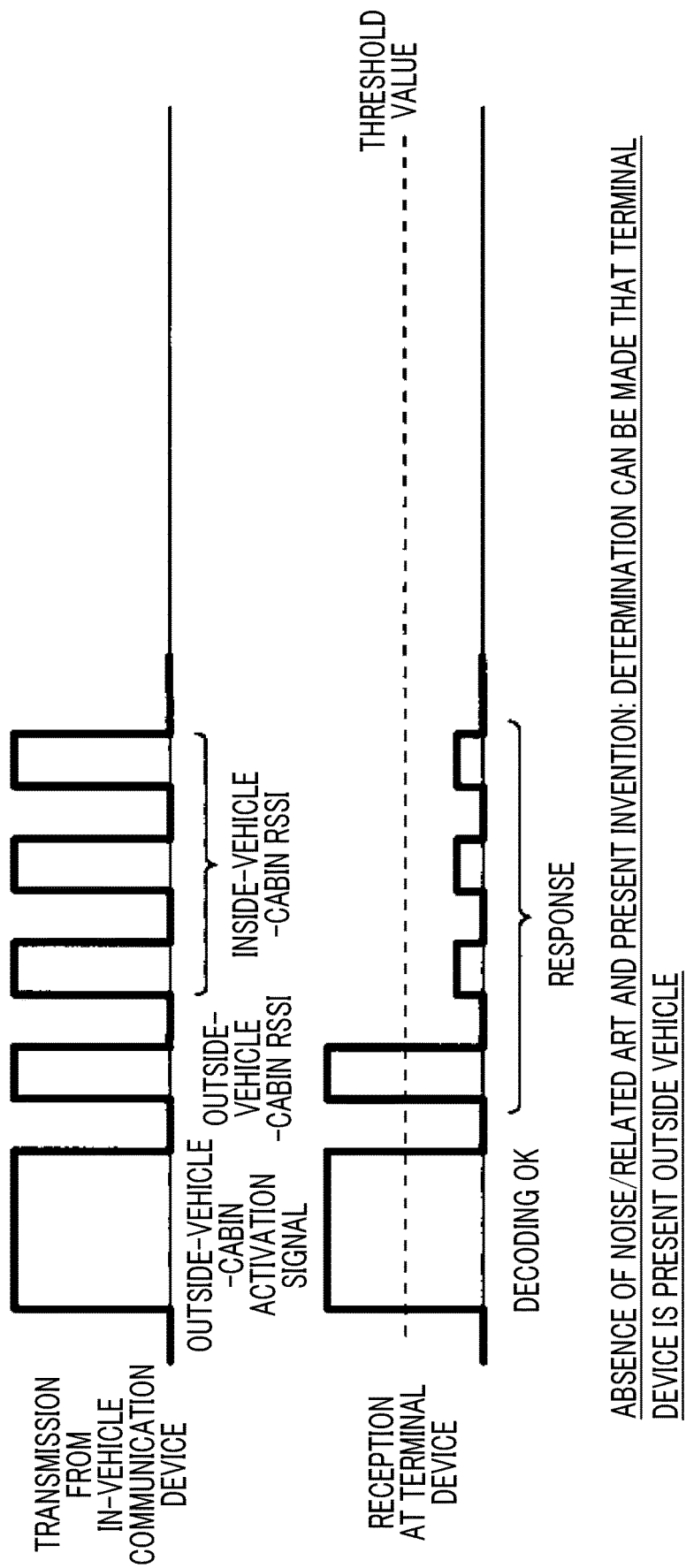
FIG. 3A is a timing diagram illustrating a difference between communication control of the embodiment and communication control of the related art.

FIGS. 3A to 3C are timing diagrams illustrating a difference between communication control of the embodiment and communication control of the related art. FIGS. 3A to 3C illustrate situations in which the user touches a vehicle door handle when the terminal device 20 is present outside the vehicle (outside the vehicle cabin). In the examples of FIGS. 3A to 3C, an example in which three inside-vehicle-cabin transmission antennas 13-1 to 13-3 are provided in the vehicle cabin, and three signals are transmitted as the second inside-vehicle-cabin signal from the inside-vehicle-cabin transmission antennas 13-1 to 13-3.

As illustrated in FIG. 3A, in a communication environment in which surroundings of the vehicle are not influenced by noise, since the RSSI values of the three signals transmitted to the vehicle cabin in a first communication process do not exceed the predetermined threshold value, a determination unit 15 can determine that the terminal device 20 is present outside the vehicle (outside the vehicle cabin) in both of the communication control of the embodiment and the communication control of the related art. The determination unit 15 may determine that the terminal device 20 is present outside the vehicle (outside the vehicle cabin), for example, when one of the three RSSI values for the second inside-vehicle-cabin signal does not exceed the predetermined threshold value or may be set optionally.

On the other hand, as illustrated in FIGS. 3B and 3C, in a communication environment in which surroundings of the vehicle are influenced by noise, three RSSI values for the second inside-vehicle-cabin signal are increased by the noise and all exceed the predetermined threshold value in the first communication process. Here, in the communication control of the related art illustrated in FIG. 3B, solely the first communication process is performed. Therefore, an alarm is output or performance of a vehicle manipulation (locking or unlocking of the vehicle door) according to the user manipulation is not performed according to a result of the determination.

In the communication control of the embodiment illustrated in FIG. 3C, a communication process directed to solely the vehicle cabin is performed again after the first communication process, unlike in the communication control of the related art illustrated in FIG. 3B. In this re-communication process, the terminal device 20 present outside the vehicle (outside the vehicle cabin) cannot decode key information (a collation code based on a combination of 0 and 1) included in the third signal directed to the inside of the vehicle cabin since the key information is drowned in noise. Therefore, even when the fourth signal on which the noise is superimposed is received, reply with the second response signal is not performed. Therefore, the determination unit 15 can determine that the terminal device 20 is present outside the vehicle (outside the vehicle cabin) since the re-communication process is not established.

This determination can be similarly made when the terminal device 20 is present inside the vehicle (inside the vehicle cabin). In this case, the terminal device 20 present inside the vehicle (in the vehicle cabin) can decode the key information included in the third signal directed to the inside of the vehicle cabin. Therefore, the terminal device 20 replies to the in-vehicle communication device 10 with the second response signal, and the re-communication process is established. Therefore, the determination unit 15 can determine that the terminal device 20 is present inside the vehicle (in the vehicle cabin).

Application Example

An application example of the embodiment will be described with reference to FIGS. 4A and 4B. In the embodiment, it is assumed that the third signal directed to the inside of the vehicle cabin is drowned in noise and does not reach the terminal device 20 present outside the vehicle (outside the vehicle cabin) in a re-communication process directed to solely the inside of the vehicle cabin that is performed after the first communication process.

Figure 4A:
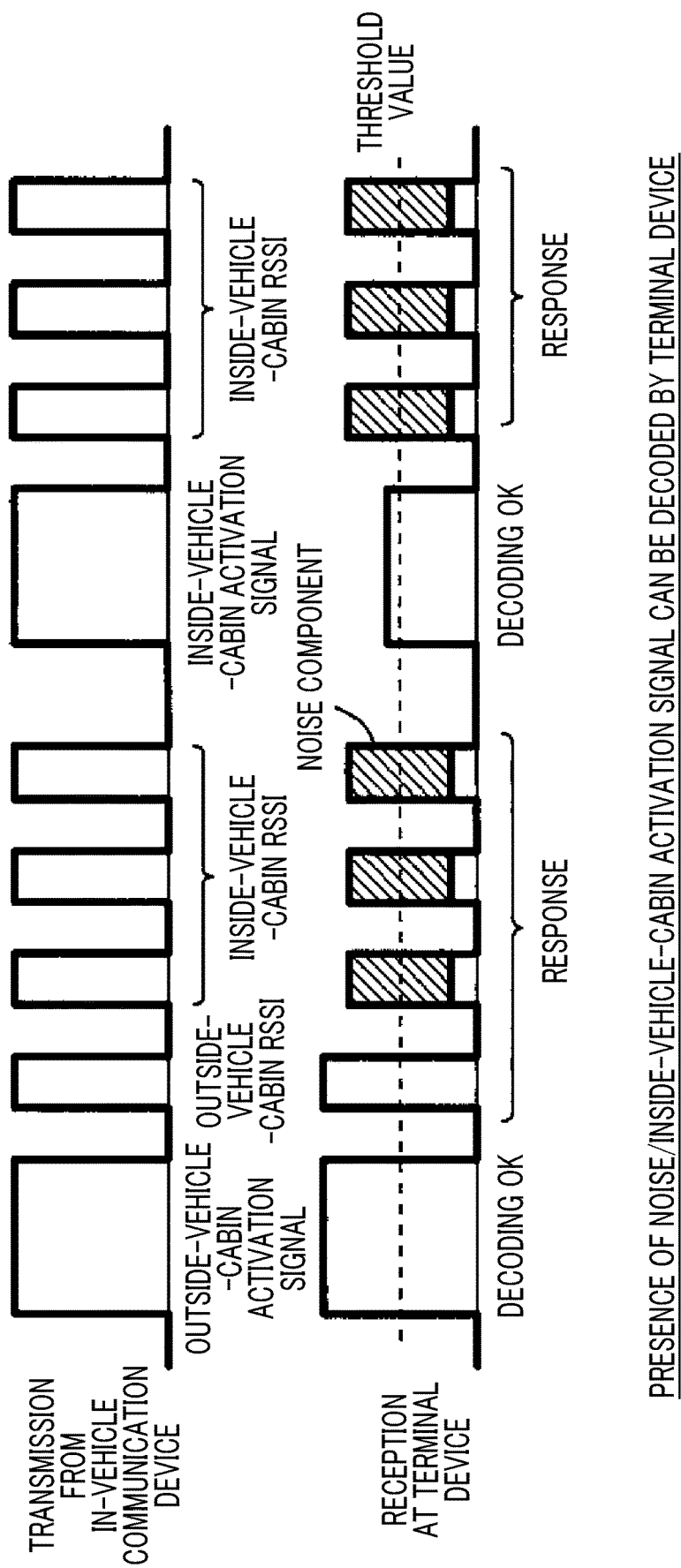
FIG. 4A is a timing diagram illustrating communication control according to an application example of the embodiment.

However, various factors such as a size or a shape of a vehicle body of the vehicle, an installation place of the inside-vehicle-cabin transmission antenna 13, and a position of the terminal device 20 present outside the vehicle (outside the vehicle cabin) may overlap, and the third signal directed to the inside of the vehicle cabin may reach the terminal device 20 present outside the vehicle (outside the vehicle cabin), as illustrated in FIG. 4A.

Figure 4B:
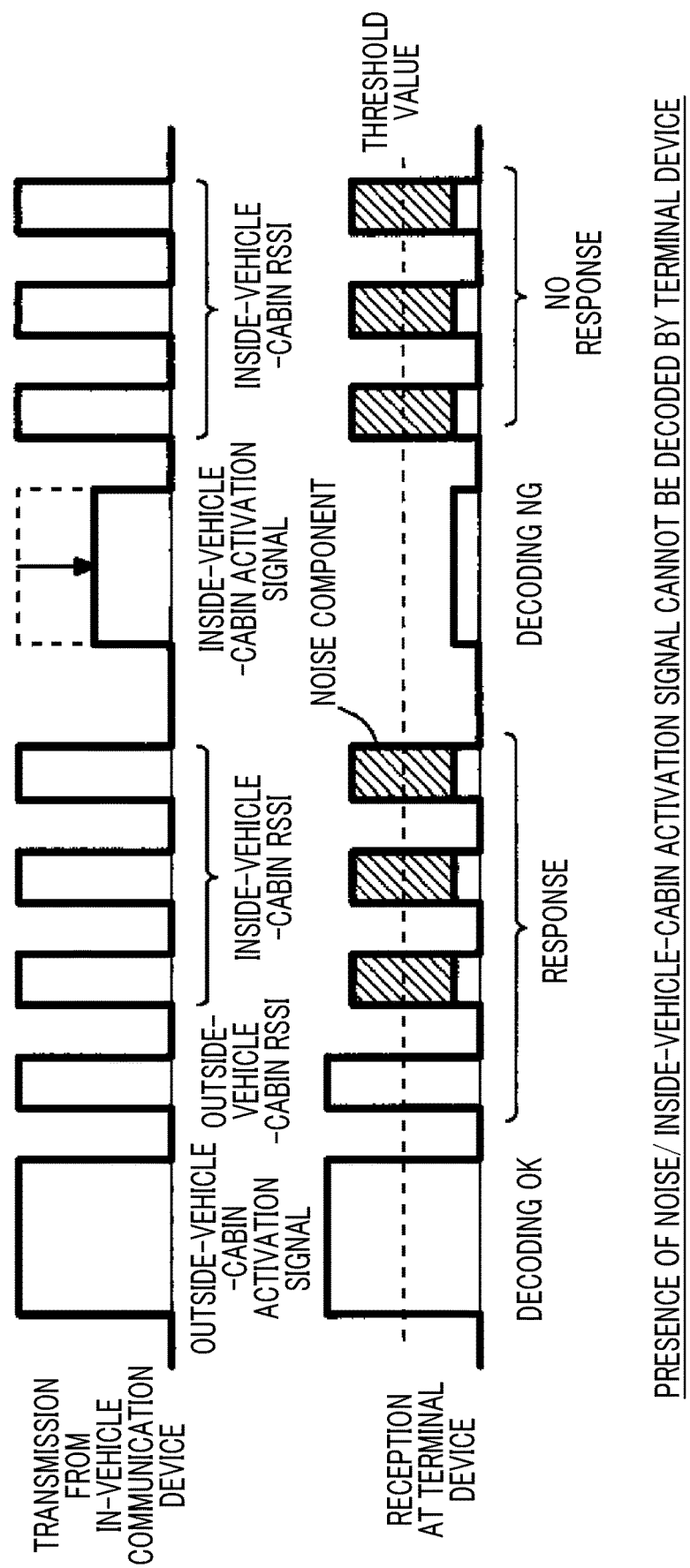
FIG. 4B is a timing diagram illustrating communication control according to an application example of the embodiment.

Therefore, as illustrated in FIG. 4B, when the re-communication process is performed after the first communication process, the transmission controller 11 makes an output intensity of the third signal to be transmitted from the inside-vehicle-cabin transmission antenna 13 lower than an output intensity of a third signal to be transmitted at the time of a communication process directed to a vehicle cabin, which is usually performed. As an example, making the output intensity of the third signal lower than the output intensity of the first signal to be transmitted from the outside-vehicle-cabin transmission antenna 12 in the first communication process is conceivable. By reducing the output intensity, it is possible to suppress the third signal directed to the inside of the vehicle cabin reaching the terminal device 20 present outside the vehicle (outside the vehicle cabin).

According to the control in this application example, a basic logic in the embodiment is capable of easily coping as it is, operation performance or noise resistance performance is not influenced in a communication environment in which there is no noise, and a vehicle manipulation according to the intention of a user manipulation can be performed under a communication environment in which there is noise.

Operation and Effects

As described above, with the in-vehicle communication device 10 according to the embodiment of the present invention, in a case where the RSSI value increases under the influence of noise or the like and a determination unit 15 is unable to determine whether the terminal device 20 is present outside or inside the vehicle through the first re-communication process using the RSSI signal (the second signal) directed to each of the outside of the vehicle cabin and inside of the vehicle cabin, the re-communication process using the third signal directed to solely the inside of the vehicle cabin is performed. The case where case where the determination unit 15 is unable to determine whether the terminal device 20 is present outside or inside the vehicle can be a case where either the reception strength of the second signal transmitted from the outside-vehicle-cabin transmission antenna 12 or the reception strength of the second signal transmitted from the inside-vehicle-cabin transmission antenna 13 is equal to or greater than the predetermined threshold value.

In this re-communication process, in a case where the terminal device 20 is present outside the vehicle (outside the vehicle cabin), the third signal directed to the inside of the vehicle cabin does not reach the terminal device 20 and in a case where the terminal device 20 is present inside the vehicle (inside the vehicle cabin), the third signal directed to the inside of the vehicle cabin reaches the terminal device 20. Accordingly, the in-vehicle communication device 10 can determine whether the terminal device 20 is present outside or inside the vehicle based on a response from the terminal device 20 after the transmission of the third signal, that is, the RSSI value or the ACK signal of the fourth signal.

Modification Example

In the embodiment, the example in which the fourth signal as the RSSI signal is transmitted after the third signal as the activation signal is transmitted in the re-communication process directed to solely the inside of the vehicle cabin after determination failure in the first communication process has been described. However, a search signal for confirming solely whether or not the terminal device 20 is present in the detection area may be used in place of the activation signal.

FIG. 5 is a flowchart illustrating a communication control processing procedure that is executed by the transmission controller 11 and the determination unit 15 of the in-vehicle communication device 10 according to the modification example. In the modification example illustrated in FIG. 5, a search signal including no key information of the vehicle to be used for a collation process is transmitted as the third signal (step S501), and a subsequent fourth signal is not transmitted. The determination unit 15 can determine whether the terminal device 20 is present outside or inside the vehicle by determining the presence or absence of an ACK signal from the terminal device 20 with respect to the search signal (step S502).

The present invention can be used in, for example, a vehicle system that controls a vehicle by performing wireless communication between a terminal device having key information of the vehicle and the in-vehicle communication device.

What is claimed is:

1. An in-vehicle communication device configured to perform communication with a terminal device having key information of a vehicle, the in-vehicle communication device comprising:
   a transmission controller configured to
      perform control so that a first signal for activating the terminal device is transmitted from an outside-vehicle-cabin transmission antenna mounted outside the vehicle, and
      perform control so that a predetermined second signal is transmitted from the outside-vehicle-cabin transmission antenna and an inside-vehicle-cabin transmission antenna mounted inside the vehicle, after the transmission of the first signal; and
   a determination unit configured to determine whether the terminal device is present outside or inside the vehicle based on a first response signal that is transmitted from the terminal device to the in-vehicle communication device after the transmission of the second signal, wherein:
   the transmission controller is configured to perform, when the determination unit is unable to determine whether the terminal device is present outside or inside the vehicle based on the first response signal that is transmitted from the terminal device to the in-vehicle communication device after the transmission of the second signal, control so that a third signal for activating the terminal device is transmitted from the inside-vehicle-cabin transmission antenna; and
   the determination unit is configured to determine whether the terminal device is present outside or inside the vehicle based on a second response signal that is transmitted from the terminal device to the in-vehicle communication device after the transmission of the third signal.

2. The in-vehicle communication device according to claim 1, wherein the determination unit is configured to
   refer to reception strength information of the second signal in the terminal device included in the first response signal, and
   determine that the determination unit is unable to determine whether the terminal device is present outside or inside the vehicle based on the first response signal when reception strength of the second signal transmitted from the outside-vehicle-cabin transmission antenna is equal to or greater than a predetermined threshold value and reception strength of the second signal transmitted from the inside-vehicle-cabin transmission antenna is equal to or greater than a predetermined threshold value.

3. The in-vehicle communication device according to claim 2, wherein the determination unit is configured to determine, in a case where the determination unit is unable to determine whether the terminal device is present outside or inside the vehicle based on the first response signal, that the terminal device is present inside the vehicle when the second response signal is received from the terminal device after the transmission of the third signal.

4. The in-vehicle communication device according to claim 2, wherein the determination unit is configured to determine, in a case where the determination unit is unable to determine whether the terminal device is present outside or inside the vehicle based on the first response signal, that the terminal device is present outside the vehicle when the second response signal is not received from the terminal device after the transmission of the third signal.

5. The in-vehicle communication device according to claim 2, wherein:
the transmission controller is configured to transmit a predetermined fourth signal from the inside-vehicle-cabin transmission antenna after the transmission of the third signal; and
the determination unit is configured to determine that the terminal device is present inside the vehicle when the determination unit is unable to determine whether the terminal device is present outside or inside the vehicle based on the first response signal and when it is determined that reception strength of the fourth signal is equal to or greater than a predetermined threshold value based on reception strength information of the fourth signal in the terminal device included in the second response signal.

6. The in-vehicle communication device according to claim 2, wherein:
the transmission controller is configured to transmit a predetermined fourth signal from the inside-vehicle-cabin transmission antenna after the transmission of the third signal; and
the determination unit is configured to determine that the terminal device is present outside the vehicle when the determination unit is unable to determine whether the terminal device is present outside or inside the vehicle based on the first response signal and when it is determined that reception strength of the fourth signal is lower than a predetermined threshold value based on reception strength information of the fourth signal in the terminal device included in the second response signal.

7. The in-vehicle communication device according to claim 1, wherein the determination unit is configured to determine that the terminal device is present outside the vehicle when it is determined, based on reception strength information of the second signal in the terminal device included in the first response signal, that reception strength of the second signal transmitted from the outside-vehicle-cabin transmission antenna is equal to or greater than a predetermined threshold value and that reception strength of the second signal transmitted from the inside-vehicle-cabin transmission antenna is lower than a predetermined threshold value.

8. The in-vehicle communication device according to claim 1, wherein the determination unit is configured to determine that the terminal device is present inside the vehicle when it is determined, based on reception strength information of the second signal in the terminal device included in the first response signal, that reception strength of the second signal transmitted from the outside-vehicle-cabin transmission antenna is lower than a predetermined threshold value and that reception strength of the second signal transmitted from the inside-vehicle-cabin transmission antenna is equal to or greater than a predetermined threshold value.

9. The in-vehicle communication device according to claim 1, wherein the transmission controller is configured to make an output intensity of the third signal lower than an output intensity of the first signal.

10. A communication method by which an in-vehicle communication device performs communication with a terminal device having key information of a vehicle, the communication method comprising:
transmitting a first signal for activating the terminal device from an outside-vehicle-cabin transmission antenna mounted outside the vehicle, when a collation process of the terminal device is needed;
transmitting a predetermined second signal from the outside-vehicle-cabin transmission antenna and an inside-vehicle-cabin transmission antenna mounted inside the vehicle, after the transmission of the first signal;
determining whether the terminal device is present outside or inside the vehicle based on a first response signal that is received from the terminal device after the transmission of the second signal;
transmitting a third signal for activating the terminal device from the inside-vehicle-cabin transmission antenna when, through the determination, the in-vehicle communication device is unable to determine whether the terminal device is present outside or inside the vehicle based on the first response signal that is received from the terminal device after the transmission of the second signal; and
determining whether the terminal device is present outside or inside the vehicle based on a second response signal that is received from the terminal device after the transmission of the third signal.

* * * * *